United States Patent [19]

Schmidt

[11] Patent Number: 4,736,412
[45] Date of Patent: Apr. 5, 1988

[54] METHOD OF AND CIRCUIT ARRANGEMENT FOR EVALUATING THE OUTPUT SIGNALS OF CURRENT FLOW DETECTORS IN TELECOMMUNICATION FACILITIES

[75] Inventor: Manfred Schmidt, Salz, Fed. Rep. of Germany

[73] Assignee: U. S. Philips Corporation, New York, N.Y.

[21] Appl. No.: 942,662

[22] Filed: Dec. 17, 1986

[30] Foreign Application Priority Data

Dec. 21, 1985 [DE] Fed. Rep. of Germany ....... 3545574

[51] Int. Cl.$^4$ ............................................. H04M 3/22
[52] U.S. Cl. ...................................... 379/382; 379/377
[58] Field of Search ............... 379/2, 22, 23, 27, 156, 379/157, 164, 179, 231, 252, 253, 236, 238, 12, 372, 373, 377, 379, 380, 381, 382, 385, 372, 352

[56] References Cited

U.S. PATENT DOCUMENTS

| | | | |
|---|---|---|---|
| 4,197,435 | 4/1980 | Jackson et al. | 379/2 |
| 4,356,355 | 10/1982 | Ferrieu | 379/382 |
| 4,524,245 | 6/1985 | Littlefield | 379/373 |
| 4,540,854 | 9/1985 | Beirne | 379/377 X |
| 4,679,229 | 7/1987 | Yamaguchi | 379/373 |
| 4,689,816 | 8/1987 | Wood | 379/382 |

FOREIGN PATENT DOCUMENTS 2732126 9/1978 Fed. Rep. of Germany ...... 379/379

Primary Examiner—Jin F. Ng
Assistant Examiner—R. Vaas
Attorney, Agent, or Firm—Thomas A. Briody; Jack Oisher; William J. Streeter

[57] ABSTRACT

The flow of direct current and/or ringing alternating current in a telephone line subscriber loop is detected by means of current flow detectors. The output signals produced by the current flow detectors are applied to an evaluation circuit, the zero-crossings of the ringing alternating current being used to determine whether a ringing alternating current has been superimposed on the loop direct current.

In order to increase the reliability of the evaluation and to detect noise voltages coupled into the subscriber-loop, the durations of positive and negative half-waves of the loop current are measured and the evaluation is effected by comparing the sum and the ratios of the measured values relative to a presettable threshold.

5 Claims, 3 Drawing Sheets

METHOD OF AND CIRCUIT ARRANGEMENT FOR EVALUATING THE OUTPUT SIGNALS OF CURRENT FLOW DETECTORS IN TELECOMMUNICATION FACILITIES

BACKGROUND OF THE INVENTION

1. Field of the Invention

The invention relates to a method and circuit for evaluating the output signals of subscriber line current flow detectors in a telephone exchange.

2. Description of the Related Art

The detection of current flows is a criterion which is often required in electrical circuits. The flow of subscriber line loop direct current and/or ringing alternating current can be detected in the telephone exchange by means of current flow detectors. West German Pat. No. DE-AS 23 59 867 discloses a circuit arrangement in a telephone exchange for detecting direct current on which an alternating current is superimposed, in which the flow of the loop direct current and/or of the ringing alternating current can be detected by means of opto-couplers and the output signals of the current flow detectors are evaluated by an evaluation circuit. The zero-crossings of the loop current determined by the current flow detectors are used in the evaluation circuit for the purpose of supervision.

In addition, West German Pat. No. DE-AS 29 25 409 describes a circuit arrangement for detecting answering by a called subscriber, in which such answering can also be detected during the transmission of the ringing current. The subscriber set is remotely supplied from the switching exchange via the subscriber connecting lines. The amplitude of the loop direct current then depends, as does also the amplitude of the ringing alternating current, on the length of the subscriber lines. What is commonly referred to as loop current recognizers (current flow detectors) are connected to a subscriber line, it then being possible to check on the basis of the logic value of the potential of the detector output signals whether loop direct current flows. For the detection of ringing alternating current, opto-couplers are provided which are connected to a subscriber line via the contact of a relay of the ringing current generator and isolating capacitors. For the detection of loop direct current and ringing alternating current the output signals of the loop current recognizer and of the opto-coupler are applied to an evaluation circuit, constituted by an extensive gate logic circuit. Checking whether a ringing alternating current is superposed on the loop direct current is effected during the zero-crossing of the ringing alternating current. The opto-couplers, which are connected to anti-parallel to each other, are arranged in the direct current-free branch of the ringing current supply line in parallel with a resistor provided in the ringing current supply line.

The circuit arrangement disclosed in the aforesaid West German Pat. No. DE-AS 29 25 409 has the disadvantage that the circuit cost and design efforts for the evaluation circuit are comparatively high and that the output signals produced by the loop current detectors are only considered to be valid when the opto-couplers detect a zero-crossing of the ringing alternating current. Noise induced in the subscriber connecting line, for example common-mode voltages, may produce faulty results in the evaluation circuit.

In addition, the circuit arrangement described in the aforesaid West German Pat. Nos. DE-AS 23 59 867 and DE-AS 29 25 409 have the disadvantage that hidden interferences produced by line interruptions or a short-circuit to earth in the subscriber connecting line are not detected in a flowing ringing alternating current.

SUMMARY OF THE INVENTION

The invention has for its object to provide a method of evaluating the output signals of current flow detectors in communication facilities, with the aid of which interferences in the subscriber connecting line can be detected in a reliable manner.

By the evaluation of the ratios between positive and negative half-waves of the loop current, hidden interferences caused by line interruptions or a short circuit to earth can be detected in the subscriber connecting line. Also noise voltages induced in the subscriber connecting line, for example common mode voltages, do not produce faulty results in the evaluation circuit.

In one embodiment of the invention, it is possible for the evaluation circuit to distinguish between an interference caused by short-circuiting to earth or a line interruption in the subscriber connecting line.

By providing a current flow detector for determining the desired current direction of the ringing alternating current in parallel with the ringing current generator, then the evaluation can be effected synchronously and frequency tolerances of the ringing current generator do not affect the evaluation.

A circuit arrangement for carrying out the method, more specifically for pre-processing of the current flow detector output signal, is of a simple structure and results in a simple processing of the signals in the evaluation circuit.

BRIEF DESCRIPTION OF THE DRAWINGS

The invention will now be described in greater detail by way of example with reference to an embodiments thereof shown in the accompanying drawing. Therein.

DESCRIPTION OF THE PREFERRED EMBODIMENTS

Figure 1:
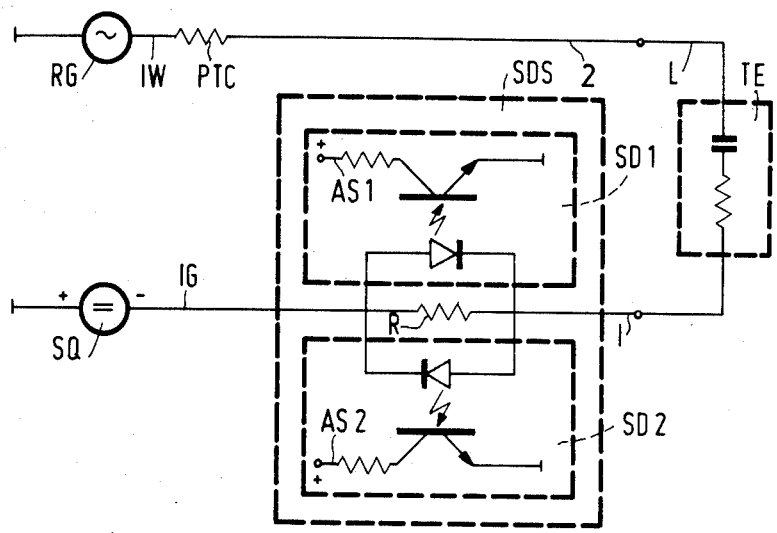
FIG. 1 shows a first embodiment of the arrangement of current flow detectors in the subscriber connecting line.

FIG. 1 shows a first embodiment for the arrangement of current flow detectors SD1 and SD2 in the a-wire 1 of a subscriber connecting terminal L. In a current flow detection circuit SDS two opto-couplers SD1 and SD2 provided in anti-parallel to each other are arranged in parallel with a resistor R, for the object of current flow detection. With the aid of the opto-couplers SD1 and SD2, the current direction can be detected on feeding the ringing alternating current into the b-wire 2 of the subscriber connecting line L by means of a ringing current generator RG. A subscriber set TE connected to the subscriber connecting line L is remotely supplied by a power supply source SQ incorporated in the switching exchange. The output signals of the current flow detectors SD1 and SD2 are applied to an evaluation circuit AS (cf. FIG. 4). In order to limit, in the event of a short-circuit to earth in one of the two wires of the subscriber connecting line L, the ringing alternating current produced by the ringing current generator RG a PTC-resistor (positive temperature coefficient resistor) PTC is included in the b-wire 2 of the subscriber connecting line L. By arranging the current flow detectors SD1 and SD2 in anti-parallel, they are each active in one half-wave of the ringing alternating current. In order to reduce noise effects it is possible to set a threshold (lowest current for the detection), by means of the resistor R.

Figure 2:
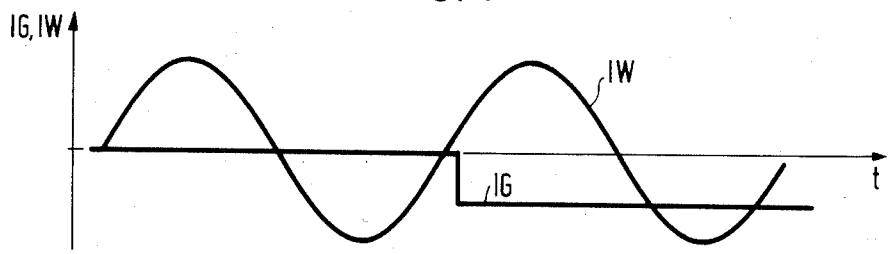
FIG. 2 shows the variation versus time of the output signals of the current flow detectors.
Figure 2:
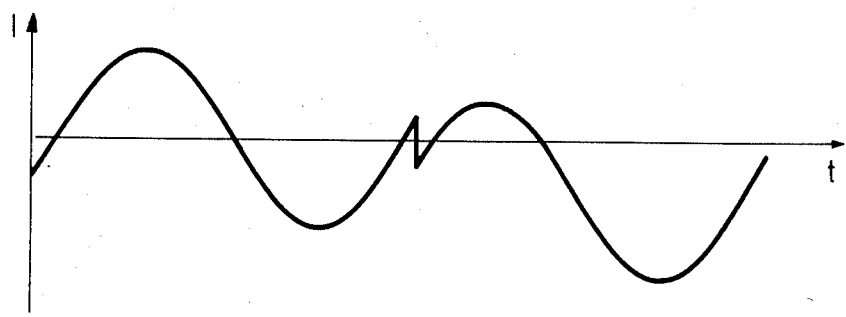
Figure 2:
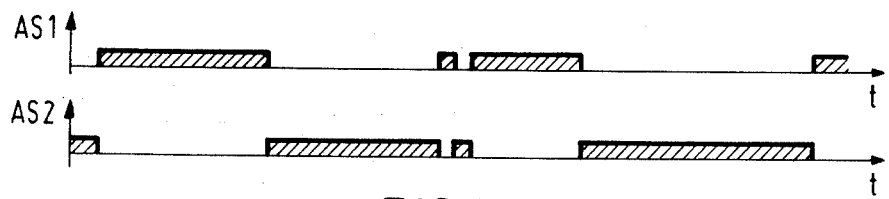

FIG. 2 shows the variation with time of the output signals AS1 and AS2 of the current flow detectors SD1 and SD2. With a direct current-free sinusoidal ringing alternating current IW flowing through the subscriber connecting line L, the current flow detectors SD1 and SD2 are alternately active, the turn-on times being in a ratio of 1:1 to each other. In the off-hook condition, a supply direct current IG flows additionally and the ratio between the turn-on instants of the current flow detectors SD1 and SD2 changes. From these inputs, or from the ratio of the turn-on instants to each other, respectively, it is possible to draw conclusions about the state of the subscriber connecting line L.

The evaluation in the evaluation circuit AS is then not limited to the use in a remotely supplied subscriber arrangement TE, but it can alternatively be used in a local battery-fed subscriber arrangement TE.

By a corresponding rating of the resistor R, for example in the event of a short-circuit to earth in the subscriber connecting line L, it is possible to suppress, for the evaluation, noise signals induced in the subscriber connecting line, the value of the lowest current having a value of some mA. For a ringing alternating current produced by the ringing current generator RG and having an amplitude of 60 V and a frequency of 25 Hz the evaluation period in the evaluation circuit AS has a duration of approximately 40 ms. During this evaluation period the duration of the positive and negative half-waves of the loop current I is determined. If the sum of the two measuring values fall short of a first predetermined threshold, the threshold value for the sum value of the period being at approximately zero, then the evaluation circuit AS decides there is a line interruption or a short-circuit to earth in the b-wire, as no ringing alternating current IW has flown across the subscriber arrangement TE. In a further evaluation step the two durations are brought into proportion to each other and this ratio is compared to a second threshold in the evaluation circuit AS. If the ratio for the duration of the negative half-wave to the positive half-wave is, for example, 1:1 then the evaluation circuit AS determines that the ringing alternating current IW flows. If the ratio between the negative and the positive half-waves of the loop current I has shifted to higher values, for example to a ratio of 1:1.5, then the evaluation circuit AS determines that the ringing alternating current IW flows and that the subscriber's loop is closed. If this ratio continues to increase and a third threshold is exceeded, that is to say the duration of the negative half-wave approximately corresponds to the evaluation period, then the evaluation circuit AS determines that there is a short-circuit to earth in the a-wire.

Figure 3:
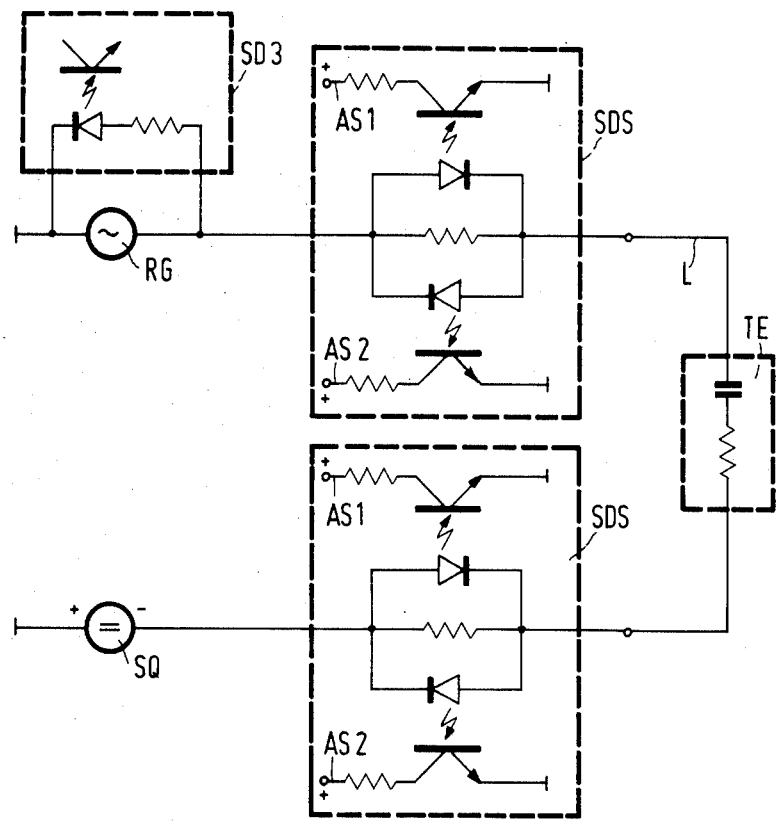
FIG. 3 shows a second embodiment of the arrangement of current flow detector in the subscriber connecting line.

FIG. 3 shows a second embodiment of the arrangement of the current flow detection circuit SDS in the subscriber connecting line L. By incorporating a second current flow detection circuit SDS2 in the b-wire of the subscriber connecting line L it is possible to distinguish in the evaluation circuit AS between a short-circuit to earth and a line interruption on the basis of the output signals AS1, AS2 of the two current flow detection circuits SDS1 and SDS2. In addition, a current flow detector SD3 is arranged in parallel with the ringing current generator RG, which, in the evaluation circuit AS, results in a synchronous evaluation with estimation of the magnitude of the common-mode voltage induced in the subscriber connecting line L being effected on the basis of the output signals of the current flow detector SD3. Consequently, also frequency tolerances of the ringing current generator RG can be compensated for and the evaluation security in the evaluation circuit AS can be increased.

The combination according to the invention of current flow detectors and the embodiment of the evaluation circuit AS is not limited in the feed-in of the ringing alternating current IW and the supply direct current IF shown in FIG. 1, but can alternatively be used for feeding-in the supply direct current IG and the ringing alternating current IW into the same wire of the subscriber-connecting line L.

Figure 4:
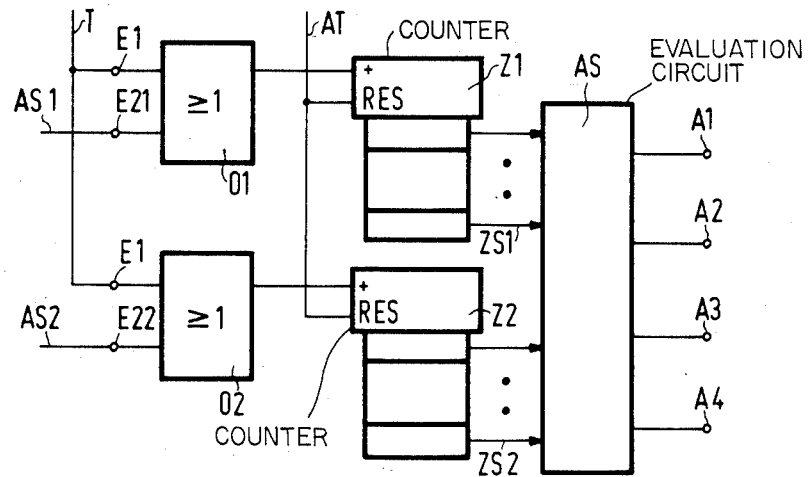
FIG. 4 shows an embodiment for the pre-processing of the output signal produced by the current flow detectors.

FIG. 4 shows an embodiment for the pre-processing of the output signals AS1 and AS2 produced by the current flow detection circuit SDS. In this situation the two output signals AS1 and AS2 of the current flow detection circuit SDS are always applied to inputs E21, E22 of OR-elements O1 and O2. The counting clock pulse T is applied to the other inputs E1 of the two OR-elements 01 and 02. The outputs of the two OR-elements 01 and 02 are connected to the clock inputs of two counters Z1 and Z2. The evaluation clock AT is applied to the reset inputs RES of the two counters Z1 and Z2. The evaluation circuit AS is connected to the two counters Z1 and Z2 and performs the evaluation on the basis of a comparison of the counter positions ZS1 and ZS2 to presettable thresholds.

Figure 5:
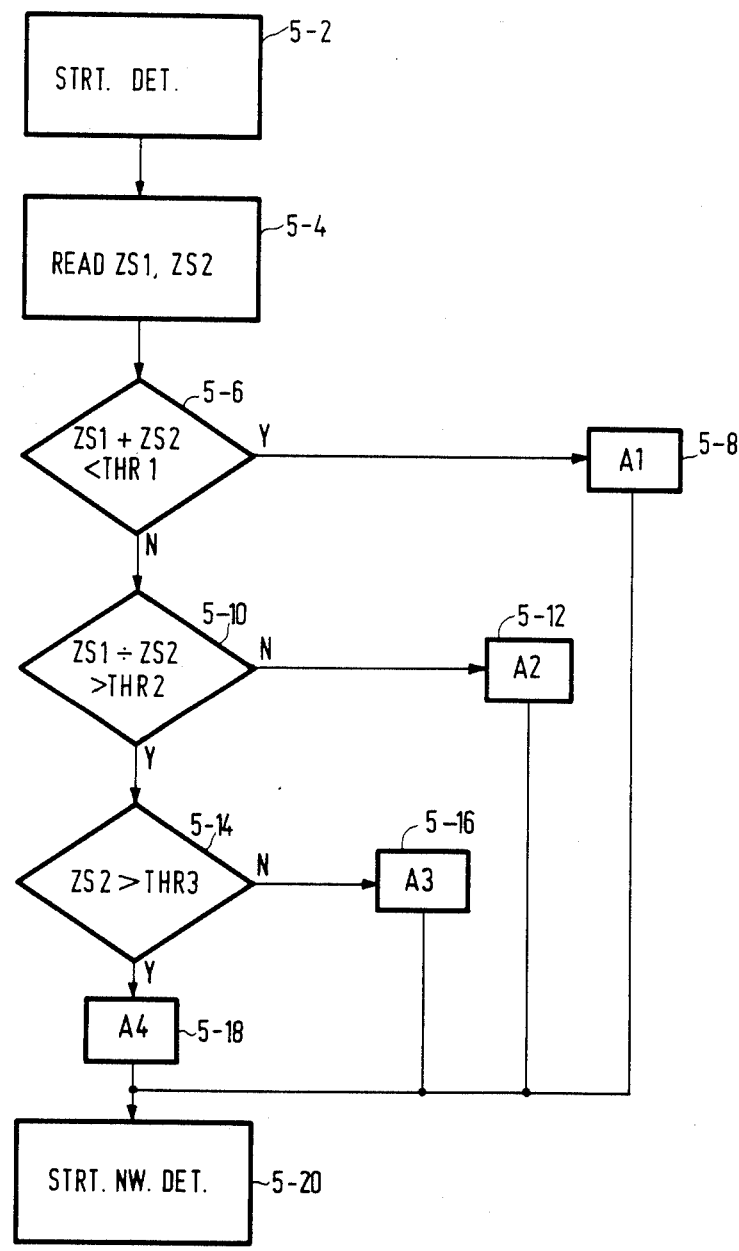
FIG. 5 is a program flow chart of the evaluation circuit according to the invention.

FIG. 5 shows the program flow chart of the evaluation circuit AS according to the invention.

| Reference no. | Caption | Meaning: |
|---|---|---|
| 5-2 | STRT.DET. | Start of an evaluation cycle; |
| 5-4 | READ ZS1,ZS2. | the counting positions ZS1 and ZS2 of the two counters Z1 and Z2 are read; |
| 5-6 | ZS1 + ZS2 < THR1 | Check whether the sum of the two counting positions ZS1 and ZS2 falls short of a first threshold; |
| 5-8 0 | A1 | the evaluation circuit detects a line interruption or a short-circuit to earth in the b-wire; |
| 5-10 | ZS1:ZS2 > THR2 | check whether the ratio between the two counting positions exceeds a second threshold; |
| 5-12 | A2 | the evaluation circuit determines that a ringing alternating current is transmitted whilst the subscriber loop is not being closed; |
| 5-14 | ZS2 > THR3 | check, whether the third counting position ZS2 exceeds a third threshold; |
| 5-16 | A3 | the evaluation circuit determines that a ringing alternating current is trans- |

| Reference no. | Caption | Meaning: |
|---|---|---|
| | | mitted whilst the subscriber loop being closed; |
| 5-18 | A4 | the evaluation circuit detects a short-circuit to earth in the a-wire of the subscriber-connecting line. |
| 5-20 | STRT.NW.DET. | Start of a further evaluation cycle. |

At the start of the evaluation the counter positions ZS1 and ZS2 of the two counters Z1 and Z2 are read and the sum of the two counter positions ZS1 and ZS2 is compared to a first, fixed preset threshold. The threshold has a value of approximately 0, the evaluation circuit AS, when the sum of the two counter positions ZS1 and ZS2 is below the first threshold, decides there is a line interruption or a short-circuit to earth in the b-wire of the subscriber-connecting line L. Furthermore, in the evaluation circuit AS, further criteria are derived from the ratio between the two counter positions ZS1 and ZS2, corresponding to the durations of the positive and negative half-waves of the loop current I.

If the ratio between the two counter positions ZS1 and ZS2 is approximately 1:1, then the evaluation circuit AS detects the transmission of the ringing alternating current whilst the subscribers loop not being closed. To that end, the ratio thus formed is compared to a second threshold, the threshold value depending on the ratio between the ringing voltage and the supply voltage.

If the ratio is approximately 1:1.5 (threshold 3), then the evaluation circuit AS detects the transmission of a ringing alternating current whilst the subscriber loop being closed.

If the counter position ZS2 assumes high values and exceeds the third preset threshold, then the evaluation circuit AS detects a short-circuit to earth in the a-wire of the subscriber connecting line L.

The results of the evaluation cycle can be taken from the outputs A1 to A4 (cf. FIG. 4) of the evaluation circuit AS.

What is claimed is:

1. A method of evaluating the output signals of subscriber line current flow detectors in a telephone exchange, such exchange including at least one current flow detector (SDS) connected to one of a pair of subscriber lines and which comprises two opto-couplers (SD1, SD2) connected in anti-parallel and a resistor (R) connected in parallel with said opto-couplers, and an evaluation circuit (AS) connected to the detector (SDS), such method being characterized in that: the durations of positive and negative half-waves of the loop current (I) are measured during an evaluation period, when the sum of the two durations is less than a first fixed presettable threshold the evaluation circuit (AS) detects occurrence of an interruption or a short-circuit to earth in the other of the subscriber wires, when there is a ratio of approximately 1:1 (second presettable threshold) between the two durations the evaluation circuit (AS) detects the ringing alternating current transmitted while the subscriber line loop is open, and at a ratio of approximately 1:1.5 (third presettable threshold) between the two durations the evaluation circuit (AS) detects the transmission of ringing alternating current while the subscriber line loop is closed, and when the ratio between the two durations substantially exceeds 1:1.5 the evaluation circuit (AS) detects a short-circuit to earth in said one subscriber wire.

2. A method as claimed in claim 1, wherein a second current flow detection circuit (SDS) is included in the other of the pair of subscriber wires, further characterized in that a distinction between a short-circuit to earth and a line interruption is made in the evaluation circuit (AS) by comparing output signals (AS1, AS2) of the two current flow detection circuits (SDS).

3. A method as claimed in claim 1, wherein a further current flow detector (SD3) is arranged in parallel with a ringing generator (RG) connected to one of the subscriber wires, further characterized in that a synchronous evaluation with estimation of the magnitude of common-mode voltages induced into the subscriber line loop is effected in the evaluation circuit (AS) by comparing the output signals of said further current flow detector (SD3).

4. A circuit arrangement for performing the method as claimed in claim 1, characterized in that two output signals (AS1, AS2) of the current flow detection circuit (SDS) are applied to inputs (E21, E22) of respective OR-elements (01, 02), having other inputs receiving (E1) a clock pulse (T), that the outputs of the two OR-elements (01, 02) are connected to the clock inputs of respective counters (Z1, Z2) to whose reset-inputs (RES) an evaluation clock signal (AT) is applied, and that the evaluation circuit (AS) is connected to the two counters (Z1, Z2) and effects the evaluation on the basis of a comparison of the counter values (ZS1, ZS2) to presettable thresholds.

5. A circuit arrangement as claimed in claim 3, wherein when there is a short-circuit to earth in the subscriber line the ringing alternating current produced by the ringing generator (RG) is limited by a positive temperature coefficient resistor (PTC) connected between a terminal of the ringing generator (RG) and one of the subscriber wires.

* * * * *